United States Patent [19]
Huang

[11] Patent Number: 5,551,745
[45] Date of Patent: Sep. 3, 1996

[54] ADJUSTING DEVICE FOR A HOOD OF A TOY STROLLER

[76] Inventor: Ming T. Huang, 4Fl., No. 302, Sec. 7, Cheng Teh Rd., Taipei, Taiwan

[21] Appl. No.: 416,050

[22] Filed: Apr. 4, 1995

[51] Int. Cl.⁶ ...................................................... B60J 7/12
[52] U.S. Cl. .................... 296/111; 296/122; 297/184.17; 403/97; 135/133
[58] Field of Search .................................. 296/107, 111, 296/118, 121, 122; 297/184.17, 184.15; 280/47.38; 5/416; 403/97; 135/132, 133

[56] References Cited

U.S. PATENT DOCUMENTS

| 1,126,236 | 1/1915 | Lees | 5/416 |
| 5,039,118 | 8/1991 | Huang | 403/97 X |
| 5,190,390 | 3/1993 | Ming-Tai | 403/97 X |

FOREIGN PATENT DOCUMENTS

| 291517 | 7/1991 | German Dem. Rep. | 280/47.38 |

*Primary Examiner*—Dennis H. Pedder
*Attorney, Agent, or Firm*—Hamilton, Brook, Smith & Reynolds, P.C.

[57] ABSTRACT

An adjusting device for a hood of a toy stroller includes a middle element engaged to a side tube of the toy stroller, a first side element and a second side element engaged to a first side and a second side of the middle element which has a tubular portion extending laterally from both sides thereof, each tubular portion having a toothed portion defined in an outer periphery thereof, the first side element and the second side element each having a skirt portion extending laterally from a side facing the corresponding toothed portion of the middle element and having a plurality of protrusions extending radially from an inner periphery of the skirt portion for engagement with the corresponding toothed portion, a first support and a second support for supporting the hood, each having two distal ends engaged to the respective first side element and the second side element such that the hood can be extended by rotating the first support and/or the second support by moving the protrusions across the toothed portions engaged therewith.

3 Claims, 5 Drawing Sheets

ADJUSTING DEVICE FOR A HOOD OF A TOY STROLLER

BACKGROUND OF THE INVENTION

The present invention relates to an adjusting device and more particularly, to an adjusting device for a hood of a toy stroller.

A toy stroller generally comprises a frame which has four wheels rotatably disposed to an under side thereof and a seat portion disposed to an upper portion thereof, a handle for pushing the stroller is disposed to an end of the frame and a hood which is disposed above the seat portion. Generally speaking, the hood of a conventional toy stroller can only be operated to either an open position or a closed position, however such a function is too simple for a child to have fun in operating it.

The present invention intends to provide an adjusting device which has a function of micro-adjusting the hood so as to provide a lot of fun for a child when operating the toy stroller and this mitigates and/or obviates the above-mentioned problems.

SUMMARY OF THE INVENTION

The present invention provides an adjusting device for a hood of a toy stroller, which includes a middle element engaged to a side tube of the toy stroller, a first side element and a second side element engaged to a first side and a second side of the middle-element which has a toothed portion extending laterally from both sides thereof, the first side element and the second side element each having a skirt portion extending laterally from a side facing the corresponding toothed portion and having a plurality of protrusions extending radially from an inner periphery of the skirt portion for engagement with the corresponding toothed portion, a first and a second supports for supporting the hood, each having two distal ends engaged to the respective first side elements and the second side elements such that the hood can be extended by rotating the first support and/or the second support by moving the protrusions across the toothed portions engaged therewith.

It is an object of the present invention to provide an adjusting device for a hood of a toy stroller, which has a function of adjusting the hood to a desired position by simply rotating the first and the second supports.

It is another object of the present invention to provide an adjusting device for a hood of a toy stroller, which has a function of micro-adjustment.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
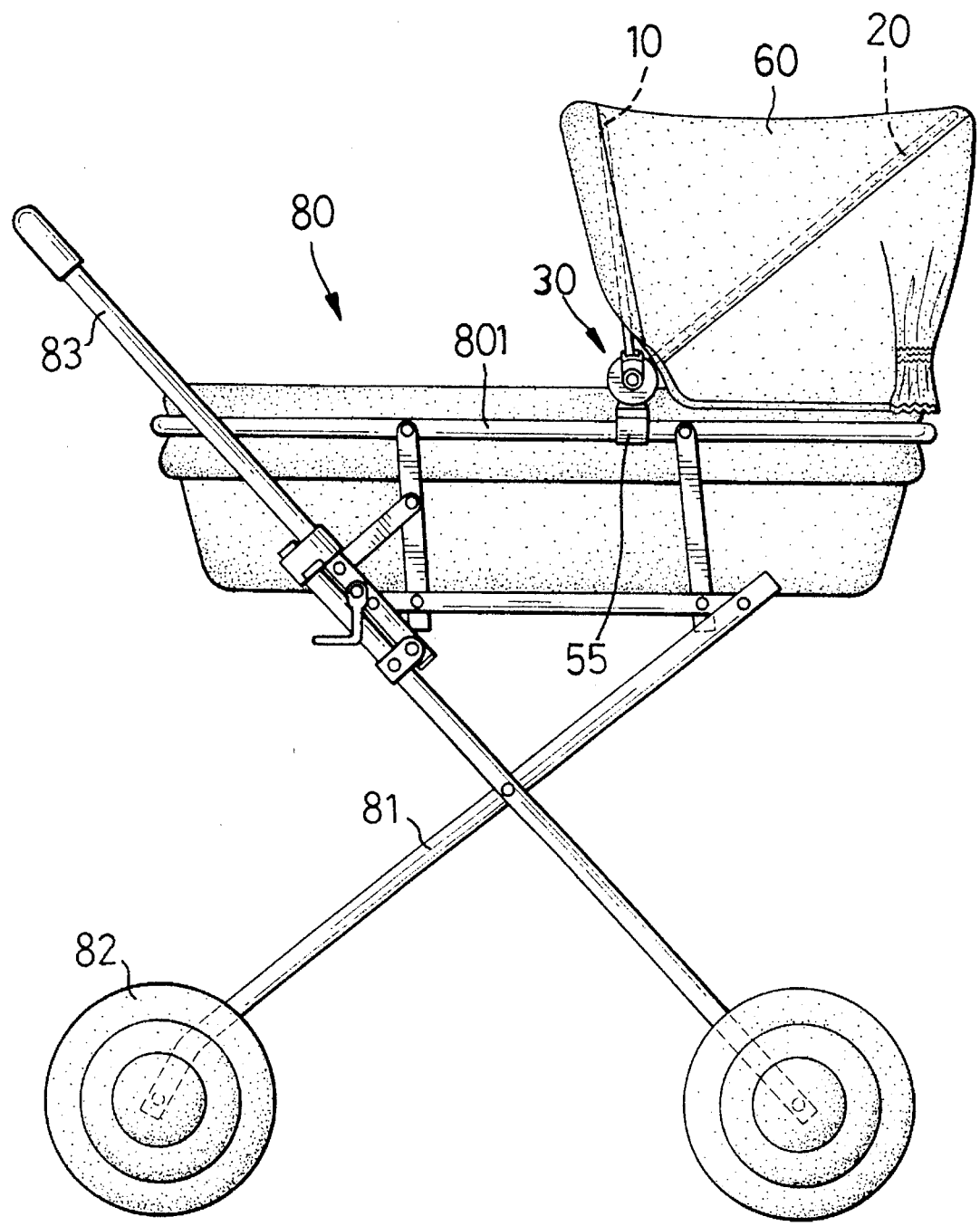
FIG. 1 is a side elevational view of a toy stroller having an adjusting device in accordance with the present invention wherein a first support and a second support of the hood are shown in phantom lines.
Figure 2:
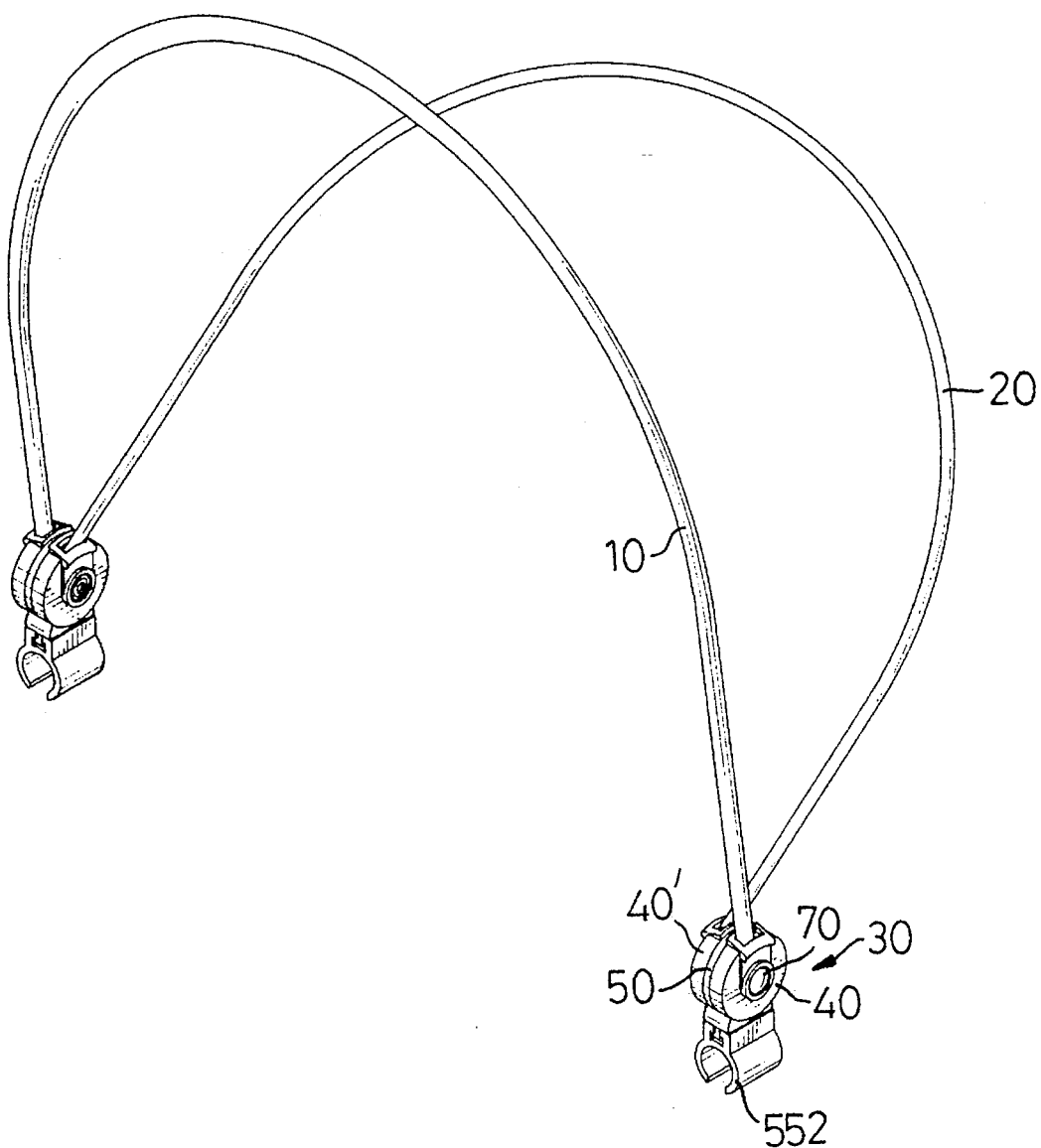
FIG. 2 is a perspective view of the adjusting device, the first and the second supports in accordance with the present invention.
Figure 3:
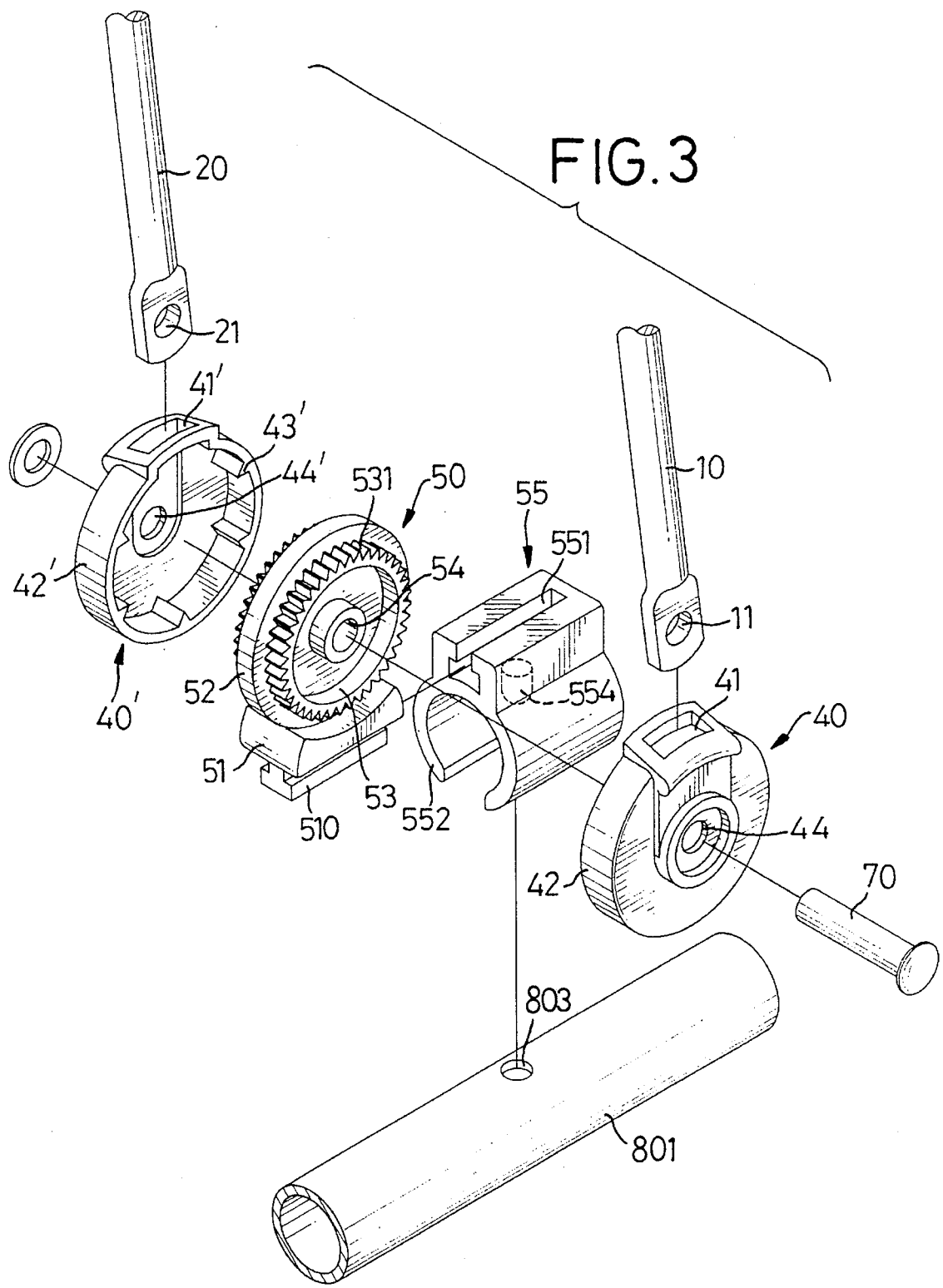
FIG. 3 is an exploded view of the adjusting device in accordance with the present invention.

Referring to the drawings and initially to FIGS. 1 through 3, a toy stroller comprises a frame 80 having a substantially rectangular seat portion which includes two side tubes 801, four legs 81 (only two are shown) pivotably engaged to an under side of the frame 80, each leg 81 having a wheel 82 rotatably disposed to a distal end thereof and a handle 83 connected to a pair of the legs 81. The adjusting device in accordance with the present invention generally includes two sets of control means 30 each of which has a middle element 50, a coupling means 55, a first side element 40 and a second side element 40'. The middle element 50 has a top portion 52 and a lower portion 51, the lower portion 51 thereof having an inverted T-shaped extending portion 510 and the top portion 52 thereof being a circular plate which has a first side and a second side for the first side element 40 and the second side element 40' to be disposed thereto respectively, a hole 54 defined in a center of the top portion 52, each of the first side and the second side of the top portion 52 having a tubular portion 53 extending laterally therefrom and each tubular portion 53 having a toothed periphery 531 defined in an outer periphery thereof. The coupling means 55 has an inverted T-shaped slot 551 defined in a top thereof for receiving the extending portion 510 therein and has a C-shaped portion 552 formed to a lower portion thereof for engagement with the side tube 801, wherein a stud 554 extends downwardly from an inner periphery of the C-shaped portion 552 and the side tube 801 has a hole 803 defined in a periphery thereof for receiving the stud 554 therethrough.

Each of the first and the second side elements 40, 40' has a skirt portion 42/42' extending laterally from a side facing the corresponding tubular portion 53 of the middle element 50, five protrusions 43/43' (43' not shown) extending radially from an inner periphery of the skirt portion 42/42' and engaged to the toothed portion 531 of the middle element 50, a central hole 44/44' defined in the first side element 40 and the second side element 40' and, an opening 41/41' defined in the skirt portion 42/42' respectively.

A first support 10 and a second support 20, each of which has two distal ends, each of the distal ends having a respective passage 11, 21 defined therein and the distal ends are inserted through the corresponding openings 41, 41' of the first side elements 40 and the second side elements 40' respectively for a pin 70 to extend through the central hole 44 of the first side element 40, the passage 11 of the first support 10, the hole 54 of the middle element 50, the passage 21 of the second support 20 and the central hole 44' of the second side element 40'. A plastic cover 60 is fixedly mounted to the first support 10 and the second support 20 to form a hood.

Figure 4:
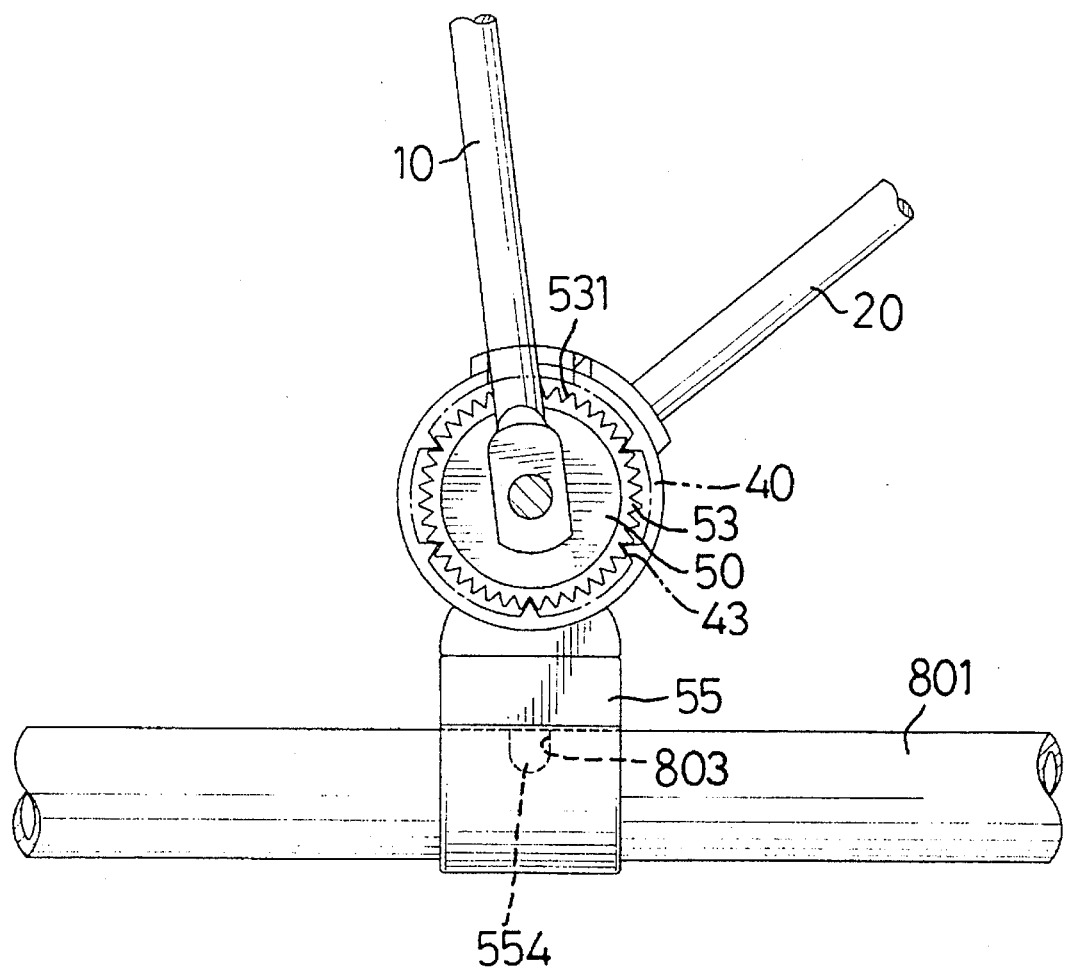
FIG. 4 is a side elevational view, partly in section, of the adjusting device fixedly engaged to a side tube of the toy stroller and shows an interior of the adjusting device.

Referring now to FIG. 4, when operating the hood, a user may rotate the first support 10 and/or the second support 20 such that the protrusions 43 of the first side element 40 and/or the second side element 40' are moved across the toothed portion 531 because of a flexibility of the protrusions 43 and the corresponding toothed portions 531, both of which are made of plastic.

Figure 5:
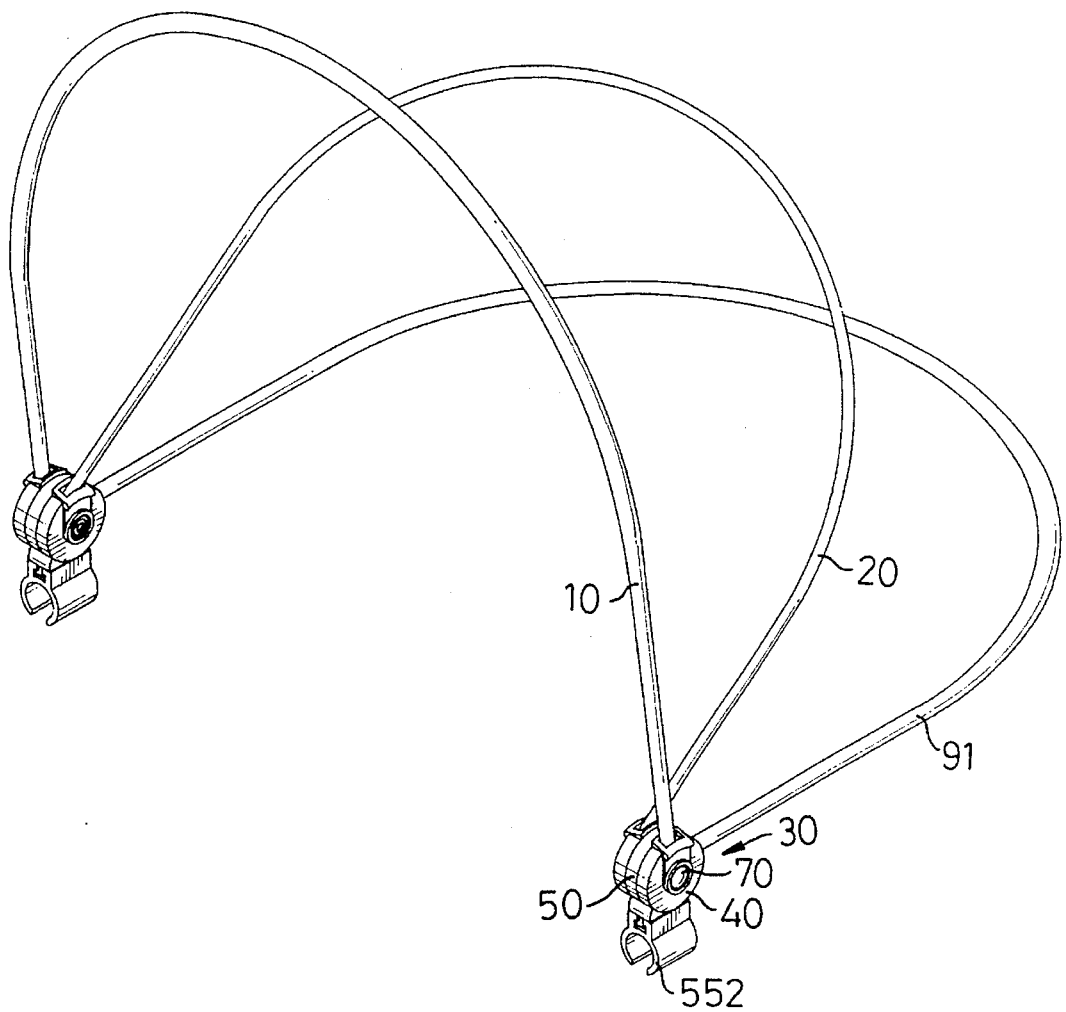
FIG. 5 is a perspective view of another embodiment of the adjusting device wherein a third support is engaged thereto.

Referring to FIG. 5 is another embodiment of the present invention., wherein a third support 91 which has two distal ends and each of the distal ends extend from a periphery of the middle element 50.

Accordingly, the adjusting means of the present invention provides a function of micro-adjustment such that the hood of the toy stroller has a lots of positions which can be set and operated so as to provide a lots of fun when operating the toy stroller.

Although the invention has been explained in relation to its preferred embodiment, it is to be understood that many other possible modifications and variations can be made without departing from the spirit and scope of the invention as hereinafter claimed.

I claim:

1. An adjusting device for a hood of a toy stroller, said stroller comprising a frame having two side tubes, a plurality of wheels rotatably disposed to an under side of said frame and a handle connected to said frame; said adjusting device comprising two sets of control means each having a middle element, a first side element and a second side element;

said middle element having a top portion and a coupling means for engagement with one of said side takes, said top portion having a first side and a second side for said first side element and said second side element disposed thereto respectively and having a hole defined in a center thereof, each of said first side and said second side of said top portion having a tubular portion extending laterally therefrom and said tubular portion having a toothed periphery defined in an outer periphery thereof;

each of said first side elements and said second side elements having a skirt portion extending laterally from a side facing said corresponding tubular portion of said middle element, a plurality of protrusions extending radially from an inner periphery of said skirt portion and engaged to said toothed portion of said middle element, a central hole defined in each of said first side element and said second side element and, an opening defined in each said skirt portion;

a first support and a second support, each having two distal ends, each of said distal ends having a passage defined therein said distal ends of said first support and said second support inserted through said openings of said first side elements and said second side elements respectively for a pin extending through said central hole of said front side element, said passage of said first support, said hole of said middle element, said passage of said second support and said central hole of second side element.

2. The adjusting device as claimed in claim 1 wherein said coupling means of said middle portion is a C-shaped configuration and a stud extending from an inner periphery thereof, said side tube having a hole defined in a periphery thereof for receiving said stud therethrough.

3. The adjusting device as claimed in claim 1 further comprises a third support which has two distal ends and each of said distal ends extending from a periphery of said middle element.

* * * * *

UNITED STATES PATENT AND TRADEMARK OFFICE
CERTIFICATE OF CORRECTION

PATENT NO. : 5,551,745

DATED : September 3, 1996

INVENTOR(S) : Ming Tai Huang

It is certified that error appears in the above-indentified patent and that said Letters Patent is hereby corrected as shown below:

In Column 3, line 23:  After the word "side", delete "takes" and insert therefor --tubes--.

Signed and Sealed this

Nineteenth Day of November, 1996

Attest:

BRUCE LEHMAN

*Attesting Officer*  *Commissioner of Patents and Trademarks*